Patented Jan. 28, 1936

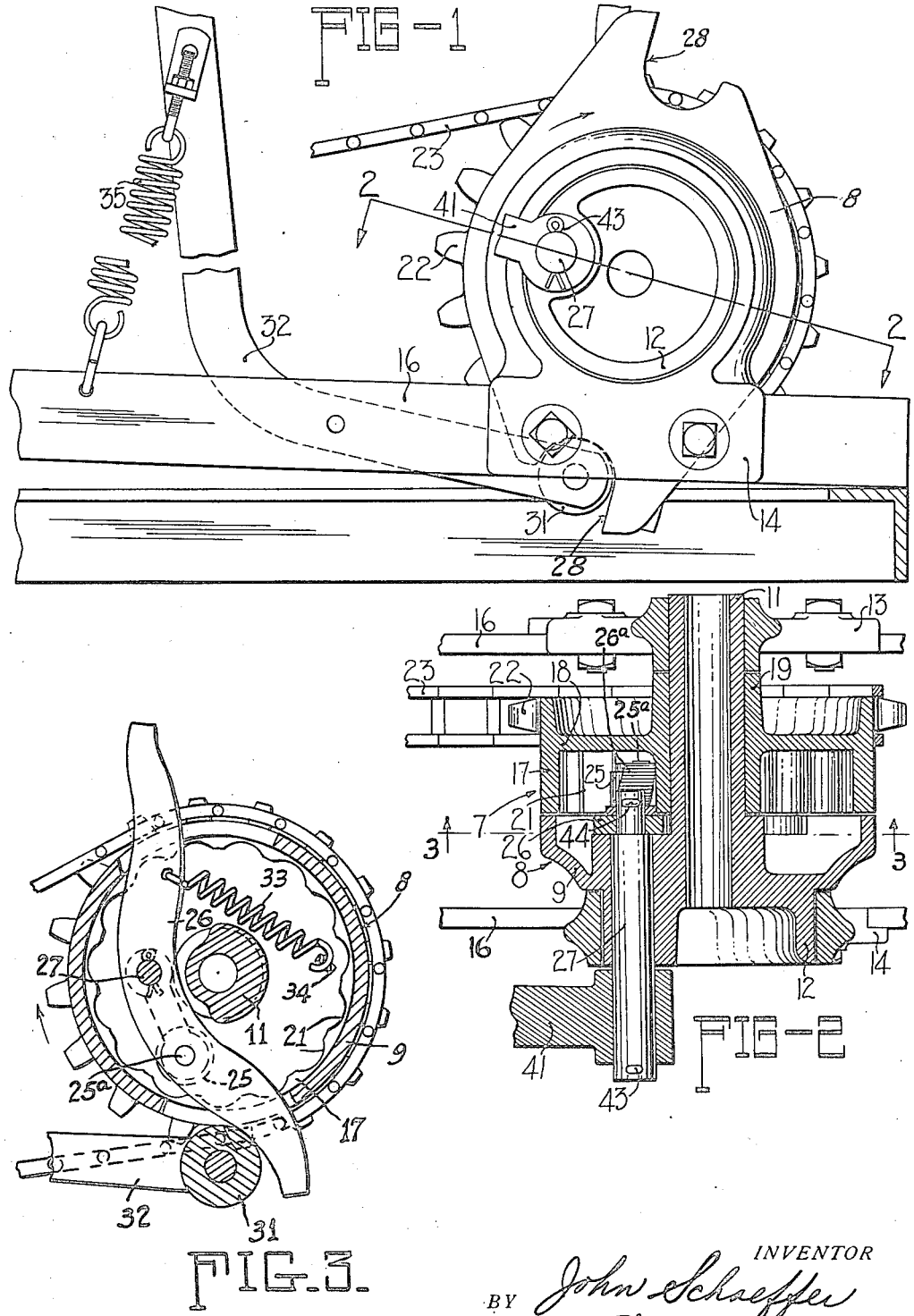

2,029,127

UNITED STATES PATENT OFFICE 2,029,127

POWER LIFT CLUTCH MECHANISM

John Schaeffer, Horicon, Wis., assignor to The Van Brunt Manufacturing Company, Horicon, Wis., a corporation of Wisconsin Application November 3, 1933, Serial No. 696,524

2 Claims. (Cl. 192—62)

My invention relates in general to power lift clutch mechanisms of the intermittently operated half revolution type, such as are commonly used on seeders, cultivators, plows and other agricultural implements, for raising the soil engaging tool out of operating position into inoperative or transport position. Clutches of this type usually comprise a constantly rotating drum member having internal corrugations, and an intermittently operated plate member rotatably mounted concentrically with respect to the drum member. The plate member carries an eccentrically pivoted clutch arm, the free end of which carries a roller adapted to engage the corrugations in the drum member to cause the plate member to be rotated with the drum member. A throw-out lever engages the clutch arm when the clutch plate member has been rotated a half revolution. A lifting link is pivoted to the plate member eccentrically thereof, to be reciprocated by the rotation of the plate member. The tools to be lifted are suitably connected to the opposite end of the lifting link.

My invention relates particularly to that type of clutch which is designed to be mounted between two spaced bearings. In such clutches, the lifting link has been pivoted to a pin on a crank arm fixed to a trunnion of the plate member on the outer side of one of the bearings, and the clutch arm has been pivoted on a separate pin on the plate member disposed between the two bearings.

The object of my invention is to provide a power lift clutch mechanism in which the clutch arm and the lifting link thereof are mounted on the opposite ends of a common pivot pin supported in the plate member. I accomplish this object by making a trunnion of the plate member and the bearing in which it is journaled of sufficiently large diameter that a common pivot pin may be supported in the trunnion in a position sufficiently removed from the axis of the trunnion to properly dispose the inner end of the pin to receive the clutch arm and the outer end to receive the lifting link.

A preferred embodiment of my invention is described in the following specification in connection with the accompanying drawing wherein:

Figure 1 is a side elevational view of a portion of the implement frame with my improved power lift mechanism mounted thereon:

Figure 2 is a sectional view of the power lift mechanism taken on the plane of the line 2—2 of Figure 1; and, Figure 3 is a sectional view taken on the plane of line 3—3 of Figure 2.

The power lift clutch mechanism comprises a constantly rotating drum member 7 and an intermittently operated plate member 8. Member 8 comprises a disk 9 having axially aligned trunnions 11 and 12 extending laterally from opposite sides thereof and journaled in bearings 13 and 14 secured to spaced parallel frame bars 16. The drum member 7 includes the usual drum having a rim 17 and a web or disk 18 formed integral therewith between the ends thereof. A hub 19 is formed at the center of web 18 and is journaled on trunnion 11 to provide a support for clutch member 7. A plurality of internal corrugations 21 are formed on the inner periphery of rim 17 at one side of web 18 and a drive sprocket 22 is cast integrally with rim 17 at the opposite side thereof. A drive chain 23 engages sprocket 22 to drive drum member 7. Chain 23 may be driven by a supporting wheel of the implement, not shown, to continuously rotate drum member 7 as the machine is drawn along the field.

Plate 8 may be intermittently rotated a half revolution, when desired, by means of a power transmitting mechanism between the two clutch members comprising a roller 25 journaled upon a pin 25a mounted on a clutch arm 26. Clutch arm 26 is pivotally mounted, intermediate its ends, on the inner end of a pivot pin 27 which is provided in plate 8 eccentrically of the axis thereof. Pin 25a is additionally supported by a strap 26a having a perforation at each end and disposed over pin 25a and over pin 27. The ends of arm 26 extend outwardly beyond the periphery of plate 8 and are disposed adjacent opposed U-shaped notches 28 formed on the periphery of plate 8. The roller 25 is normally held out of engagement with notches 21 by a roller 31 mounted on the end of an operator controlled lever 32 engaging in one or the other of notches 28 and bearing against arm 26. When lever 32 is actuated roller 31 is moved out of notch 28 and arm 26 is swung about pivot 27 by means of a spring 33, one end of which is hooked into an eye 34 formed on plate member 8. The opposite end of spring 33 is connected to arm 26. When arm 26 is swung upon pivot 27 in this manner, roller 25 is brought into engagement with one of the corrugations 21, thereby locking plate member 8 to the continuously rotating member 7 to be rotated therewith. When plate member 8 has been rotated a half revolution, roller 31 on lever 32 rides into the other notch 28, being urged therein under the action of spring 35 connected between lever 32 and the adjacent frame bar 16. At the same time, roller 31 contacts the opposite end of arm 26 forcing it back to its normal position. Roller 25 is thereby moved out of engagement with the corrugation 21.

The trunnion 12 of plate member 8 and likewise bearing 14 in which it is journaled are of sufficiently large diameter to permit pivot pin 27 to extend through trunnion 12 and project laterally therefrom on the outer side of the bearing 14, and thereby serve as the pivotal support for the lifting link 41. Lifting link 41 is suitably connected to the soil engaging tools of the implement, through the agency of which the tools are raised and lowered by the operation of the clutch mechanism. Pin 27 is held in position by means of cotter pins 43 and 44 disposed in transverse holes in the ends of the pin.

This construction has a minimum number of parts and is readily assembled and is therefore very economical to manufacture. The provision of the relatively large bearing trunnion in addition to making possible the use of a single pivot pin for the clutch arm and the lifting link, also increases the life of the clutch in providing a greater bearing area for the trunnion of the clutch upon which the greater portion of the load is imposed.

What I claim as my invention is:—

1. In a power lift mechanism comprising a continuously rotating drum member, an intermittently rotatable plate member journaled concentrically with said drum member, means for causing said plate member to be rotated with said drum including a clutch arm, a trunnion on said rotatable plate, a bearing for said trunnion, a pivot pin supported in said plate member eccentric to the axis of said trunnion, one end of said pin projecting inwardly from said plate and the other end projecting outwardly from said trunnion, said clutch arm being pivoted on said inwardly projecting end of said pin on one side of said bearing, and a lifting link pivoted on said outwardly projecting end of said pin on the other side of said bearing.

2. In a power lift mechanism comprising a continuously rotating drum member, an intermittently rotatable plate member journaled concentrically with said drum member, and means for causing said plate member to be rotated with said drum, a relatively large cylindrical trunnion formed on said rotatable plate and extending axially thereof, a bearing in which said trunnion is journaled, a pivot pin supported on said trunnion and disposed eccentrically to the axis thereof, said pin projecting outwardly beyond the outer side of said bearing, and a lifting link pivoted on said outwardly projecting end of said pin.

JOHN SCHAEFFER.